US012802349B2

(12) United States Patent
Kashimori

(10) Patent No.: US 12,802,349 B2
(45) Date of Patent: Nov. 17, 2026

(54) DATA PROCESSING DEVICE, DATA PROCESSING METHOD, AND PROGRAM

(71) Applicant: Sony Semiconductor Solutions Corporation, Atsugi (JP)

(72) Inventor: Masaki Kashimori, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 260 days.

(21) Appl. No.: 18/701,970

(22) PCT Filed: Nov. 15, 2022

(86) PCT No.: PCT/JP2022/042322
§ 371 (c)(1),
(2) Date: Sep. 9, 2024

(87) PCT Pub. No.: WO2023/095667
PCT Pub. Date: Jun. 1, 2023

(65) Prior Publication Data
US 2025/0316020 A1 Oct. 9, 2025

(30) Foreign Application Priority Data
Nov. 29, 2021 (JP) ................................. 2021-192685

(51) Int. Cl.
*G06T 17/00* (2006.01)
*G06T 7/70* (2017.01)
*G06V 10/764* (2022.01)

(52) U.S. Cl.
CPC ................ *G06T 17/00* (2013.01); *G06T 7/70* (2017.01); *G06V 10/764* (2022.01)

(58) Field of Classification Search
CPC .. G06T 17/00; G06T 7/70; G06T 7/00; G06T 13/40; G06V 10/764; G06V 40/23; G06V 10/44; G06V 40/103
See application file for complete search history.

(56) References Cited

U.S. PATENT DOCUMENTS 7,233,872 B2 6/2007 Shibasaki
2006/0161363 A1* 7/2006 Shibasaki .......... G01C 19/5607 702/94

FOREIGN PATENT DOCUMENTS

AU 2020100998 A4 7/2020
JP 2005-071182 A 3/2005
(Continued)

OTHER PUBLICATIONS

Cheng Zhiqing et al: "Static and Dynamic Human Shape Modeling", Jul. 19, 2009 (Jul. 19, 2009), SAT 2015 18th International Conference, Austin, TX, USA, Sep. 24-27, 2015; [Lecture Notes in Computer Science; Lect.Notes Computer), Springer, Berlin, Heidelberg, pp. 3-12, XP047443042.
(Continued)

*Primary Examiner* — Jeffery A Brier
(74) *Attorney, Agent, or Firm* — XSENSUS LLP

(57) ABSTRACT

The present disclosure relates to a data processing device, a data processing method, and a program that can improve convenience of posture data. A direction vector conversion unit converts 3D posture data represented by a specific feature point of a person into a direction vector and represents the posture data by a direction vector, and a model application unit applies the posture data represented by the direction vector to a CG model of the person. The posture classification unit classifies posture data for each predetermined posture and gives a label of each posture. The present technology can be applied to, for example, a data processing
(Continued)

device that generates a CG model of a person for the purpose of learning utilizing artificial intelligence.

9 Claims, 18 Drawing Sheets

(56) References Cited

FOREIGN PATENT DOCUMENTS

| | | | | |
|---|---|---|---|---|
| JP | 2008176696 | A | * | 7/2008 |
| JP | 2019-096113 | A | | 6/2019 |
| WO | 2021/084677 | A1 | | 5/2021 |

OTHER PUBLICATIONS

Ong Jeremy: "Basic Skeletal Animation with Geometric Algebra", Jan. 1, 2020 (Jan. 1, 2020), pp. 1-14, XP093248190.

International Search Report and Written Opinion mailed on Jan. 31, 2023, received for PCT Application PCT/JP2022/042322, filed on Nov. 15, 2022, 9 pages including English Translation.

* cited by examiner

FIG. 5

| No. | skeleton | Name |
|---|---|---|
| 1 | 14-16 | LeftLowLeg |
| 2 | 12-14 | LeftUpLeg |
| 3 | 15-17 | RightLowLeg |
| 4 | 13-15 | RightUpLeg |
| 5 | 12-13 | Hip |
| 6 | 12-6 | LeftUpBody |
| 7 | 13-7 | RightUpBody |
| 8 | 6-7 | Shoulder |
| 9 | 6-8 | LeftArm |
| 10 | 7-9 | RightArm |
| 11 | 8-10 | LeftForeArm |
| 12 | 9-11 | RightForeArm |
| 13 | 2-3 | Eyes |
| 14 | 2-1 | LeftNose |
| 15 | 3-1 | RightNose |
| 16 | 4-2 | LeftFace |
| 17 | 5-3 | RightFace |
| 18 | 6-1 | LeftNeck |
| 19 | 7-1 | RightNeck |

DATA PROCESSING DEVICE, DATA PROCESSING METHOD, AND PROGRAM

CROSS-REFERENCE TO RELATED APPLICATIONS

The present application is based on PCT filing PCT/JP2022/042322, filed Nov. 15, 2022, which claims priority from Japanese Patent Application No. 2021-192685, filed Nov. 29, 2021, the entire contents of each are incorporated herein by reference.

TECHNICAL FIELD

The present disclosure relates to a data processing device, a data processing method, and a program, and more particularly, to a data processing device, a data processing method, and a program capable of improving the convenience of posture data.

BACKGROUND ART

In recent years, there is a need to prepare computer graphics (CG) models of a person having a large number and variety of postures for the purpose of learning utilizing artificial intelligence or the like. However, conventionally, in modeling a CG model of a person, for example, a posture is set by manually operating bones of the CG model of the person by a CG designer, and there is a concern that time and cost increase in order to prepare a CG model of a person with a large number of various postures.

Therefore, as disclosed in Patent Document 1, there has been proposed a CG character animation creation device that converts controllable feature amounts extracted from momentarily measured values of a shape of a body into position and posture information representing angles of joints or dimensions of parts of the CG character.

CITATION LIST

Patent Document

Patent Document 1: Japanese Patent Application Laid-Open No. 2008-176696

SUMMARY OF THE INVENTION

Problems to be Solved by the Invention

Incidentally, conventionally, posture data obtained by capturing a motion of a person includes information that can identify the person, and normalization or generalization of posture data has not been performed. Therefore, there is a demand to handle posture data more uniformly and to deal with taking privacy into consideration, and it is expected that convenience in handling posture data can be improved by dealing with them.

The present disclosure has been made in view of such a situation, and an object thereof is to improve convenience of posture data.

Solutions to Problems

A data processing device according to one aspect of the present disclosure includes: a direction vector conversion unit that converts 3D posture data represented by a specific feature point of a person into a direction vector and represents the posture data with a direction vector; and a model application unit that applies the posture data represented by the direction vector to a CG model of the person.

A data processing method or a program according to one aspect of the present disclosure includes: converting 3D posture data represented by a specific feature point of a person into a direction vector and representing the posture data by a direction vector; and applying the posture data represented by the direction vector to a CG model of the person.

In one aspect of the present disclosure, the 3D posture data represented by the specific feature point of the person is converted into the direction vector, the posture data is represented by the direction vector, and the posture data represented by the direction vector is applied to the CG model of the person.

BRIEF DESCRIPTION OF DRAWINGS

FIG. 5 is a diagram illustrating start points and end points of the direction vectors and names in association with each other.

MODE FOR CARRYING OUT THE INVENTION

Hereinafter, specific embodiments according to the present technology will be described in detail with reference to the drawings.

Configuration Example of Data Processing Device

Figure 1:
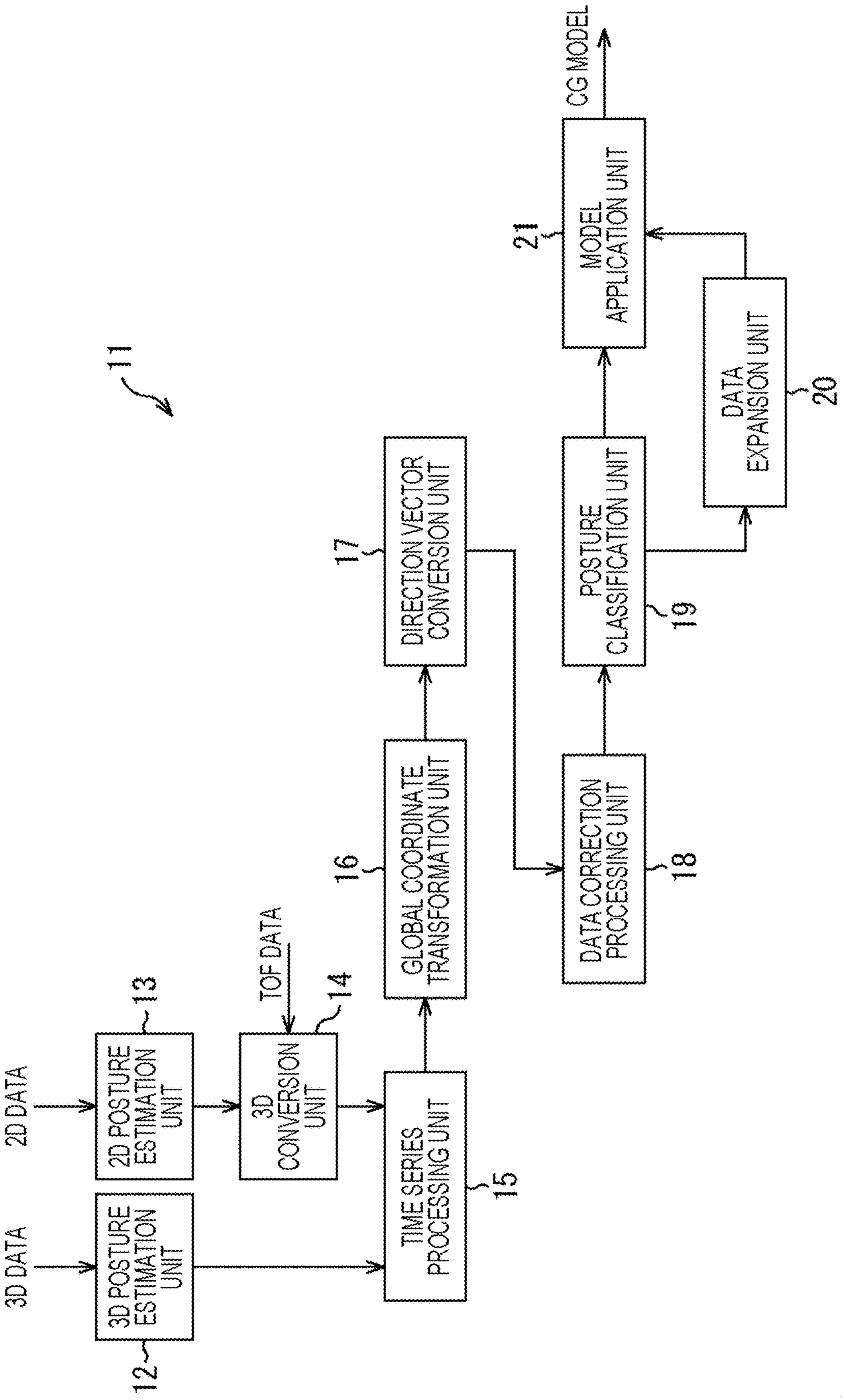
FIG. 1 is a block diagram illustrating a configuration example of a data processing device according to an embodiment of the present technology.

FIG. 1 is a block diagram illustrating a configuration example of a data processing device according to an embodiment of the present technology.

A data processing device 11 illustrated in FIG. 1 receives, for example, 3D data that is three-dimensional data obtained by measuring a person or 2D data that is two-dimensional data obtained by imaging a person. Furthermore, in a case where data processing is performed on the 2D data in the data processing device 11, for example, TOF data that is data obtained by imaging distance information with respect to a person acquired by a TOF (Time Of Flight) sensor is input to the data processing device 11. Then, as a result of performing data processing on the data, the data processing device 11 outputs, for example, a CG model to which the posture of the person to be subjected to the data processing is applied.

The data processing device 11 is configured to include a 3D posture estimation unit 12, a 2D posture estimation unit 13, a 3D conversion unit 14, a time series processing unit 15, a global coordinate transformation unit 16, a direction vector conversion unit 17, a data correction processing unit 18, a posture classification unit 19, a data expansion unit 20, and a model application unit 21.

The 3D posture estimation unit 12 estimates the posture of the person represented by the 3D data by artificial intelligence (AI) on the basis of the 3D data input to the data processing device 11, and supplies 3D posture data obtained as a result of the estimation to the time series processing unit 15.

The 2D posture estimation unit 13 estimates a posture of a person represented by the 2D data by AI on the basis of the 2D data input to the data processing device 11, and supplies 2D posture data obtained as a result of the estimation to the 3D conversion unit 14.

The 3D conversion unit 14 converts the 2D posture data supplied from the 2D posture estimation unit 13 into three-dimensional data using the TOF data, and supplies 3D posture data obtained as a result of the conversion to the time series processing unit 15.

Figure 2:
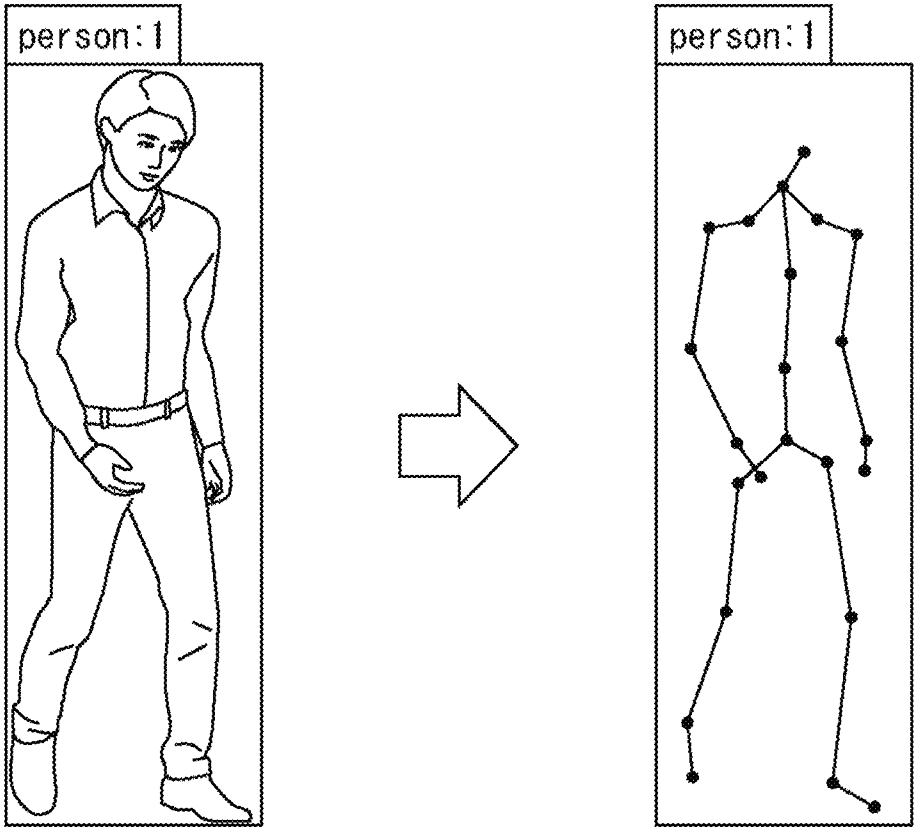
FIG. 2 is a diagram illustrating an example of 3D posture data.

Here, for example, as illustrated in FIG. 2, the 3D posture data supplied to the time series processing unit 15 is expressed by three-dimensional coordinates indicating positions of specific joints of a person to be subjected to data processing as feature points.

The time series processing unit 15 performs time series processing of associating the 3D posture data continuously supplied from the 3D posture estimation unit 12 or the 3D conversion unit 14 over time with each other for each same person. For example, the time series processing unit 15 gives a person identification (ID) for identifying the same person for each piece of 3D posture data in the time series processing.

Figure 3:
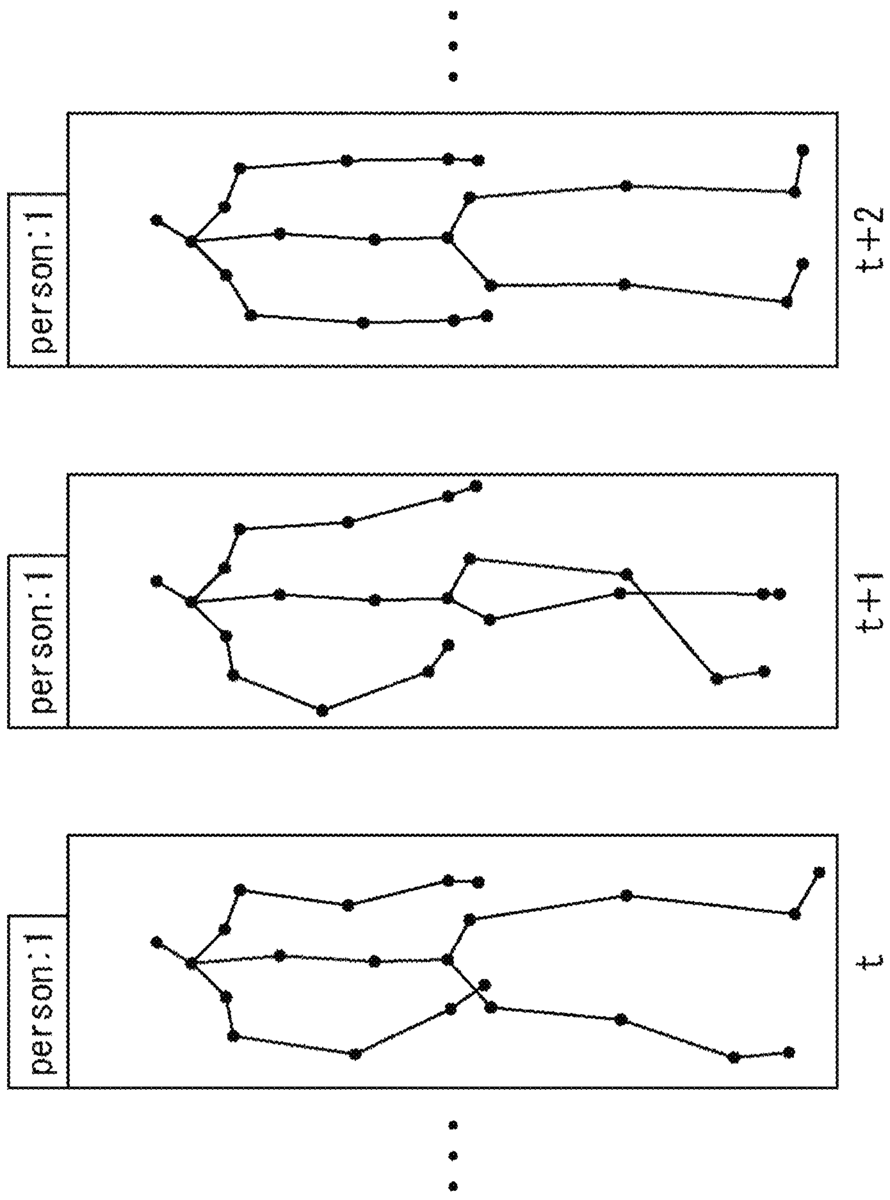
FIG. 3 is a diagram illustrating time series processing.

For example, as illustrated in FIG. 3, the time series processing unit 15 can associate 3D posture data at each time of time t, time t+1, time t+2, . . . with each other for the same person (person ID: person 1).

The global coordinate transformation unit 16 transforms the coordinates (for example, coordinates corresponding to a position of a device that has measured or captured the person) of the 3D posture data subjected to the time series processing in the time series processing unit 15 into global coordinates used for constructing a CG model in the data processing device 11.

The direction vector conversion unit 17 converts the 3D posture data converted into the global coordinates by the global coordinate transformation unit 16 into a direction vector and converts the direction vector into posture data represented by a direction vector. With conversion of the 3D posture data into the direction vector in this manner, it is possible to obtain a state in which information that can identify an individual is excluded can be obtained, and the posture of the person can be expressed as normalized data that can be uniformly handled. Note that the direction vectorization of the 3D posture data by the direction vector conversion unit 17 will be described later with reference to FIGS. 4 and 5.

The data correction processing unit 18 performs data correction processing such as data cleansing processing and data interpolation processing on the posture data converted into the direction vector by the direction vector conversion unit 17. For example, as described with reference to FIGS. 6 to 10 described later, the data cleansing processing is processing of removing posture data that cannot be taken by a human or deleting posture data due to a time series constraint. The data interpolation processing is processing of interpolating posture data removed or deleted by the data cleansing processing using posture data before and after the posture data.

The posture classification unit 19 classifies posture data subjected to data correction processing in the data correction processing unit 18 for each predetermined posture, and supplies posture data to which a label of each posture is attached to the data expansion unit 20 and the model application unit 21. For example, the posture classification unit 19 can automatically classify posture data into a stationary posture and a walking posture as described later with reference to FIGS. 11 to 13.

The data expansion unit 20 expands the posture data by appropriately combining other posture data with the posture data supplied from the posture classification unit 19, for example, by combining an upper body and a lower body as described later with reference to FIG. 14, and generates new posture data. As a result, the data expansion unit 20 can generate not only posture data based on 3D data or 2D data input to the data processing device 11 but also a large amount of more various posture data. Then, the data expansion unit 20 supplies the newly generated posture data to the model application unit 21.

The model application unit 21 applies the posture data supplied from the posture classification unit 19 or the posture data supplied from the data expansion unit 20 to the CG model, and outputs the CG model of the posture corresponding to the posture data.

The data processing device 11 is configured in this manner, and can output a large number of CG models to which more various posture data is applied, and the posture data is represented by the direction vector, thereby being capable of improving convenience in handling the posture data.

Processing Example of Direction Vectorization Processing

A process in which the direction vector conversion unit 17 converts 3D posture data into a direction vector will be described with reference to FIGS. 4 and 5.

Figure 4:
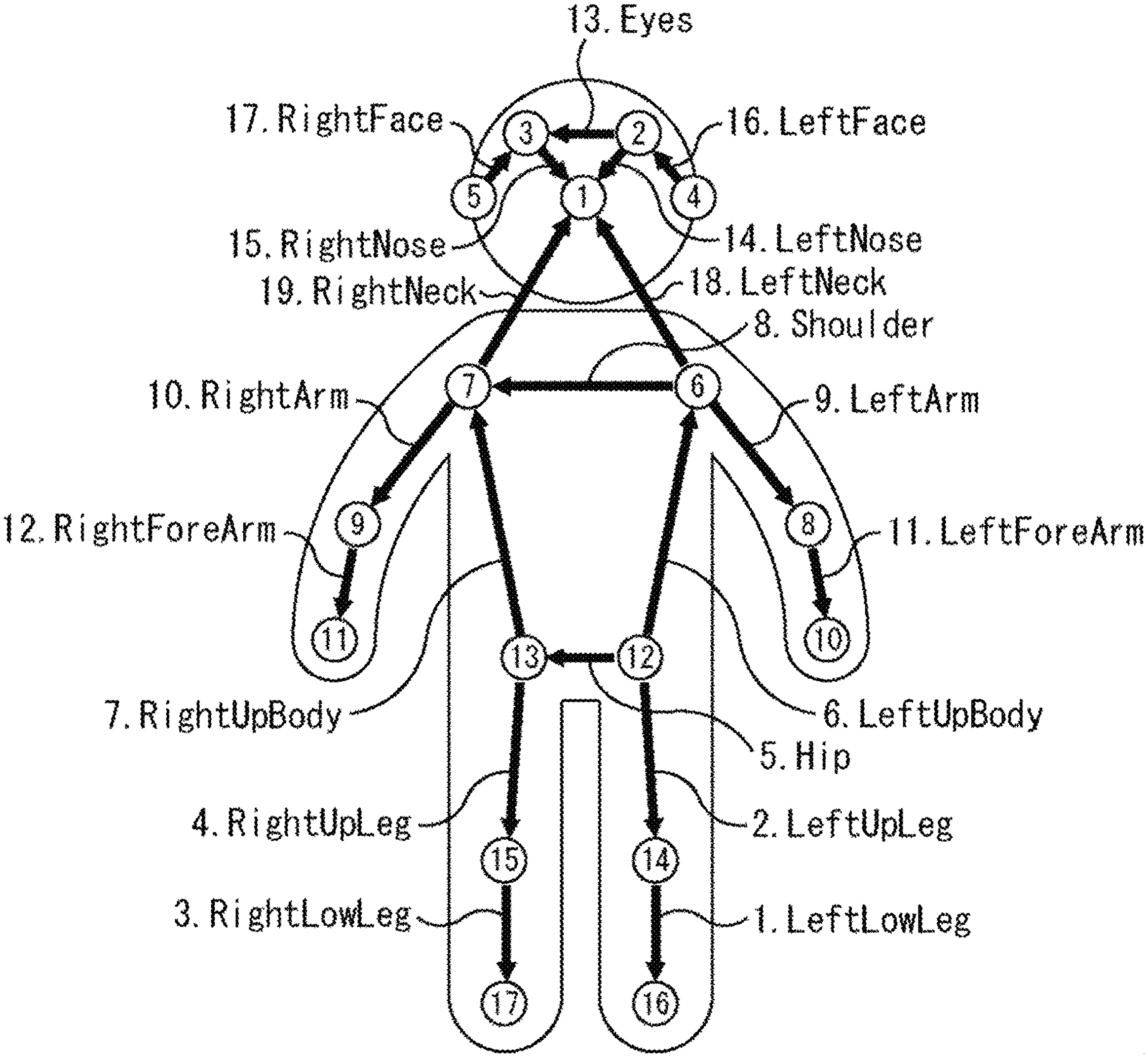
FIG. 4 is a diagram illustrating an example of direction vectors representing posture data.

For example, the direction vector conversion unit 17 converts 3D posture data represented by specific feature points of a person as illustrated in FIG. 2 into direction vectors and converts the direction vectors into posture data represented by first to 19th direction vectors having 16 points as start points or end points as illustrated in FIG. 4. In FIG. 5, a start point and an end point of each of the first to 19th direction vectors and a name thereof are illustrated in association with each other.

For example, the first direction vector is a LeftLowLeg vector with a point 14 indicating a left knee as a start point and a point 16 indicating a left heel as an end point. The second direction vector is a LeftUpLeg vector with a point 12 indicating a left waist as a start point and a point 14 indicating the left knee as an end point. The third direction vector is a RightLowLeg vector having a point 15 indicating a right knee as a start point and a point 17 indicating a right heel as an end point. The fourth direction vector is a RightUpLeg vector having a point 13 indicating a right waist as a start point and a point 15 indicating a right knee as an end point. The fifth direction vector is a Hip vector having a point 12 indicating a left waist as a start point and a point 13 indicating a right waist as an end point.

The sixth direction vector is a LeftUpBody vector having a point 12 indicating the left waist as a start point and a point 6 indicating a left shoulder as an end point. The seventh direction vector is a RightUpBody vector having a point 13 indicating the right waist as a start point and a point 7 indicating a right shoulder as an end point. The eighth direction vector is a Shoulder vector having a point 6 indicating the left shoulder as a start point and a point 7 indicating the right shoulder as an end point. The ninth direction vector is a LeftArm vector with a point 6 indicating the left shoulder as a start point and a point 8 indicating a left elbow as an end point. The 10th direction vector is a RightArm vector having a point 7 indicating the right shoulder as a start point and a point 9 indicating a right elbow as an end point. The 11th direction vector is a LeftForeArm vector having a point 8 indicating the left elbow as a start point and a point 10 indicating a left wrist as an end point. The 12th direction vector is a RightForeArm vector having a point 9 indicating the right elbow as a start point and a point 11 indicating a right wrist as an end point.

The 13th direction vector is an Eyes vector having a point 2 indicating a left eye as a start point and a point 3 indicating a right eye as an end point. The 14th direction vector is a LeftNose vector having a point 2 indicating the left eye as a start point and point 1 indicating a nose as an end point. The 15th direction vector is a RightNose vector having a point 3 indicating the right eye as a start point and point 1 indicating the nose as an end point. The 16th direction vector is a RightFace vector having a point 4 indicating a left cheek as a start point and a point 2 indicating the left eye as an end point. The 17th direction vector is a LeftFace vector having a point 5 indicating the right cheek as a start point and a point 3 indicating the right eye as an end point. The 18th direction vector is a LeftNeck vector having a point 6 indicating the left shoulder as a start point and a point 1 indicating the nose as an end point. The 19th direction vector is a RightNeck vector having a point 7 indicating the right shoulder as a start point and a point 1 indicating the nose as an end point.

Moreover, the directions of the first to 19th direction vectors can be normalized by a Hip vector that is a fifth direction vector.

Then, the posture data converted into the direction vector can be expressed as a matrix as shown in the following Expression (1) as numerical data excluding personal information.

[Ex. 1]

$$\overrightarrow{pose} = \begin{bmatrix} x_1 & y_1 & z_1 \\ \vdots & \vdots & \vdots \\ x_{19} & y_{19} & z_{19} \end{bmatrix} \tag{1}$$

$$\|[\,x_n \;\; y_n \;\; z_n\,]\| = 1$$

As described above, the direction vector conversion unit 17 can convert the 3D posture data into direction vectors and convert the direction vectors into posture data represented by a plurality of direction vectors.

Processing Example of Data Cleansing Processing

Data cleansing processing of posture data performed by the data correction processing unit 18 will be described with reference to FIGS. 6 to 10.

For example, since erroneous estimation may occur in posture estimation from a real world, the data processing device 11 introduces data cleansing processing as a mechanism for automatically removing or deleting posture data erroneously estimated.

The data correction processing unit 18 can remove unnatural posture data such as a direction vector in which the waist or shoulder is excessively inclined with respect to the horizontal or a direction vector in which the upper body is excessively inclined backward by the threshold processing by the data cleansing processing of removing posture data that cannot be taken by a human.

In FIGS. 6 to 9, for each direction vector, distribution before the data cleansing processing is performed is illustrated on a left side, and distribution after the data cleansing processing has been performed is illustrated on a right side.

Figure 6:
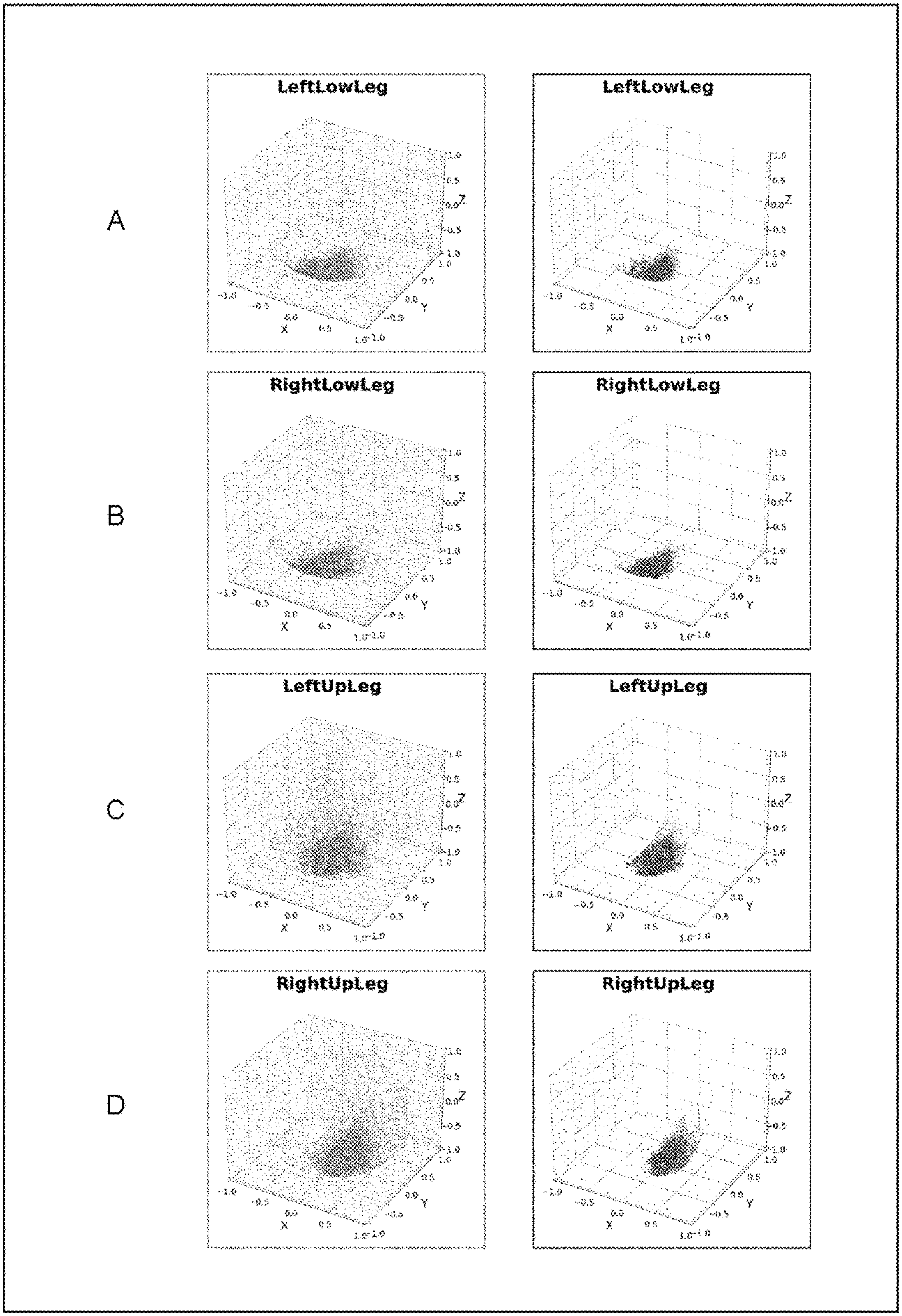
FIG. 6 is a diagram illustrating a distribution example of a LeftLowLeg vector, a RightLowLeg vector, a LeftUpLeg vector, and a RightUpLeg vector before and after data cleansing processing.

A of FIG. 6 illustrates a distribution example of the LeftLowLeg vector before and after the data cleansing processing is performed. The distribution is spread before the data cleansing processing is performed (left side), whereas the distribution is narrowed after the data cleansing processing is performed (right side), indicating that the LeftLowLeg vector that is too inclined to be taken by a human is removed by the threshold processing.

Figure 7:
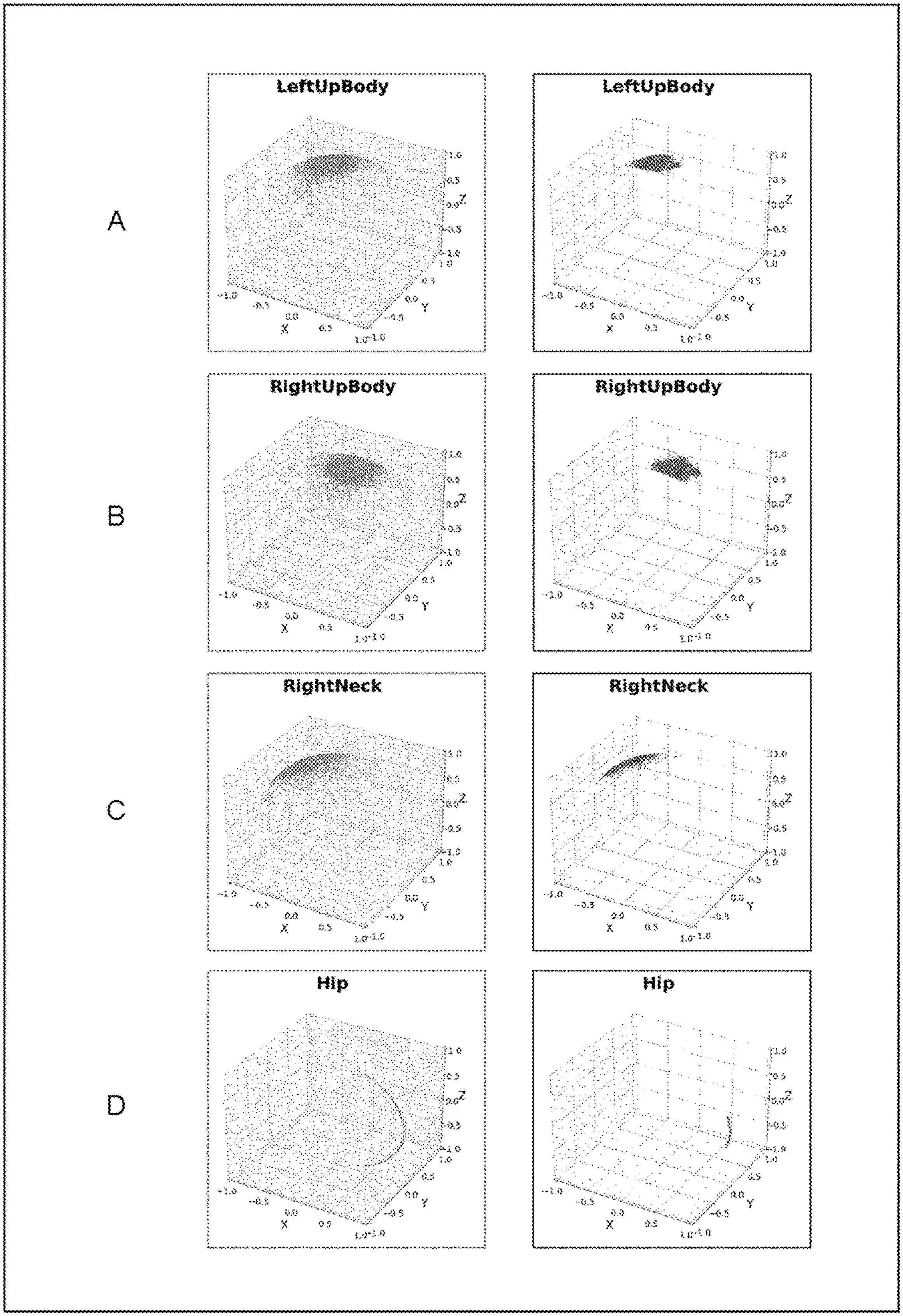
FIG. 7 is a diagram illustrating a distribution example of a LeftUpBody vector, a RightUpBody vector, a RightNeck vector, and a Hip vector before and after data cleansing processing.
Figure 8:
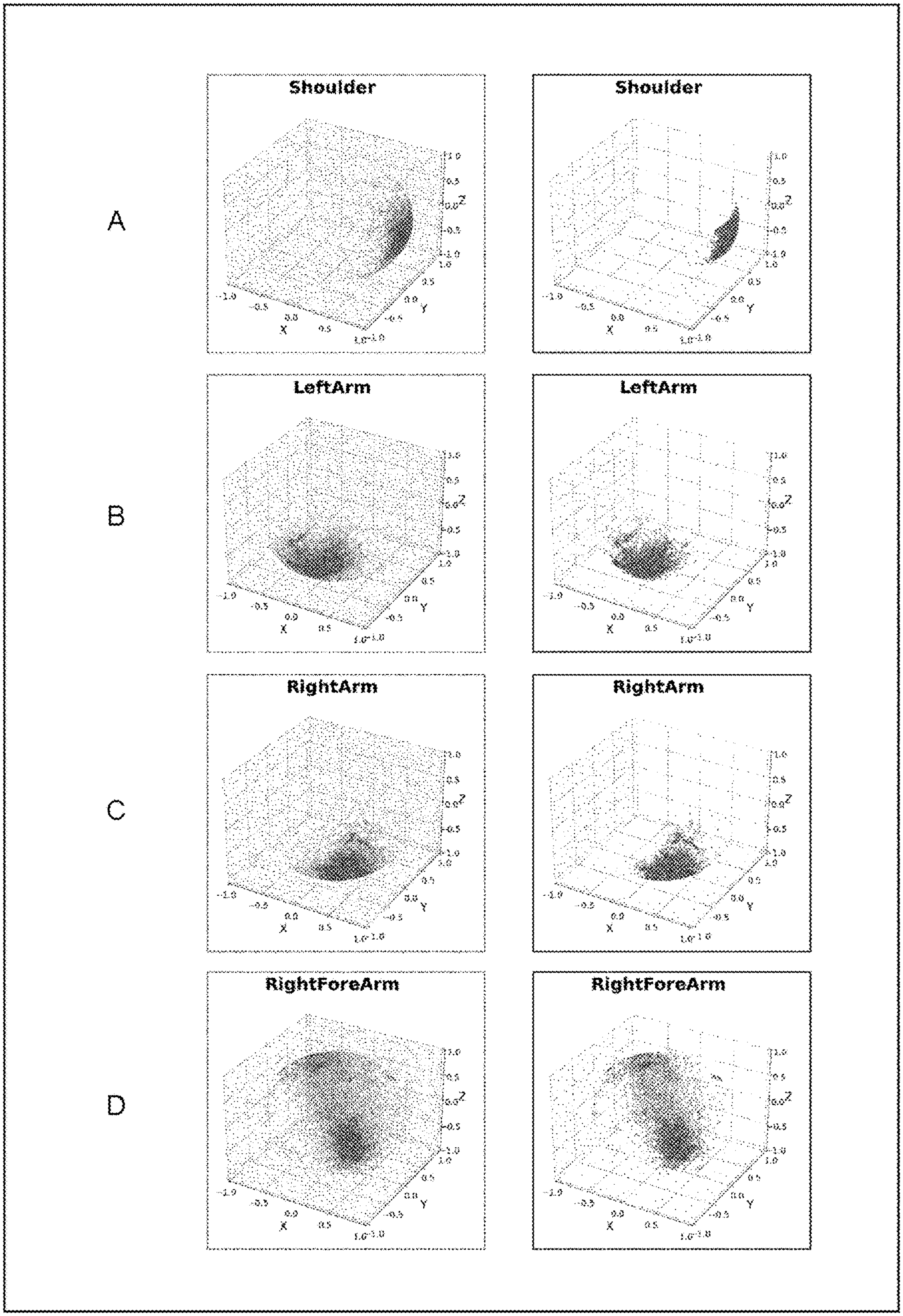
FIG. 8 is a diagram illustrating a distribution example of a Shoulder vector, a LeftArm vector, a RightArm vector, and a RightForeArm vector before and after data cleansing processing.
Figure 9:
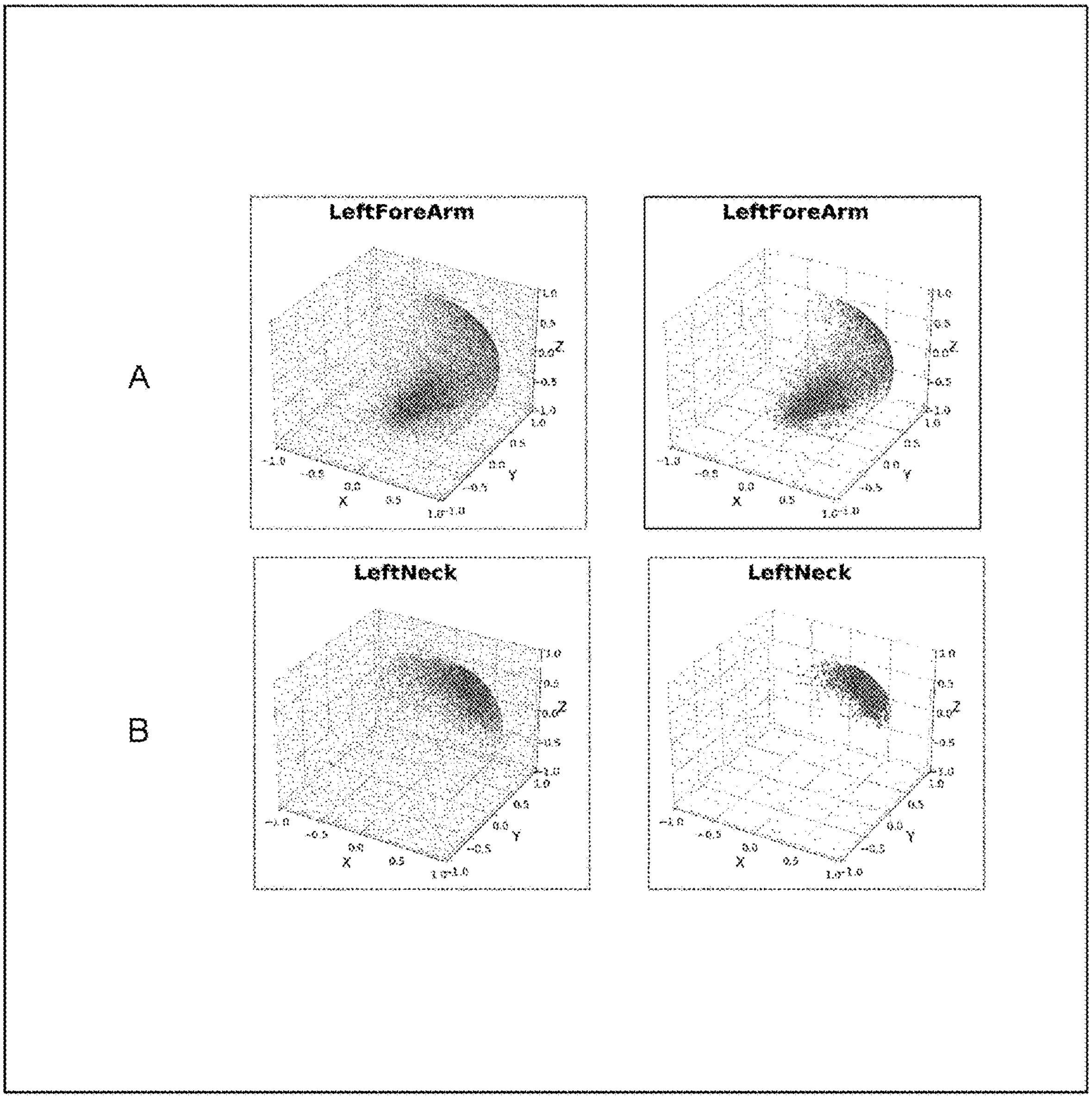
FIG. 9 is a diagram illustrating a distribution example of a LeftForeArm vector and a LeftNeck vector before and after data cleansing processing.

Hereinafter, similarly, distribution examples before and after the data cleansing processing is performed are illustrated for the RightLowLeg vector in B of FIG. 6, the LeftUpLeg vector in C of FIG. 6, and the RightUpLeg vector in D of FIG. 6. A of FIG. 7 illustrates the LeftUpBody vector, B of FIG. 7 illustrates the RightUpBody vector, C of FIG. 7 illustrates the RightNeck vector, and D of FIG. 7 illustrates the Hip vector in distribution examples before and after the data cleansing processing is performed for. A of FIG. 8 illustrates the Shoulder vector, B of FIG. 8 illustrates the LeftArm vector, C of FIG. 8 illustrates the RightArm vector, and D of FIG. 8 illustrates the RightForeArm vector in distribution examples before and after the data cleansing processing is performed. A of FIG. 9 illustrates a distribution example of the LeftForeArm vector and B of FIG. 9 illustrates a distribution example of the LeftNeck vector before and after the data cleansing processing is performed.

Figure 10:
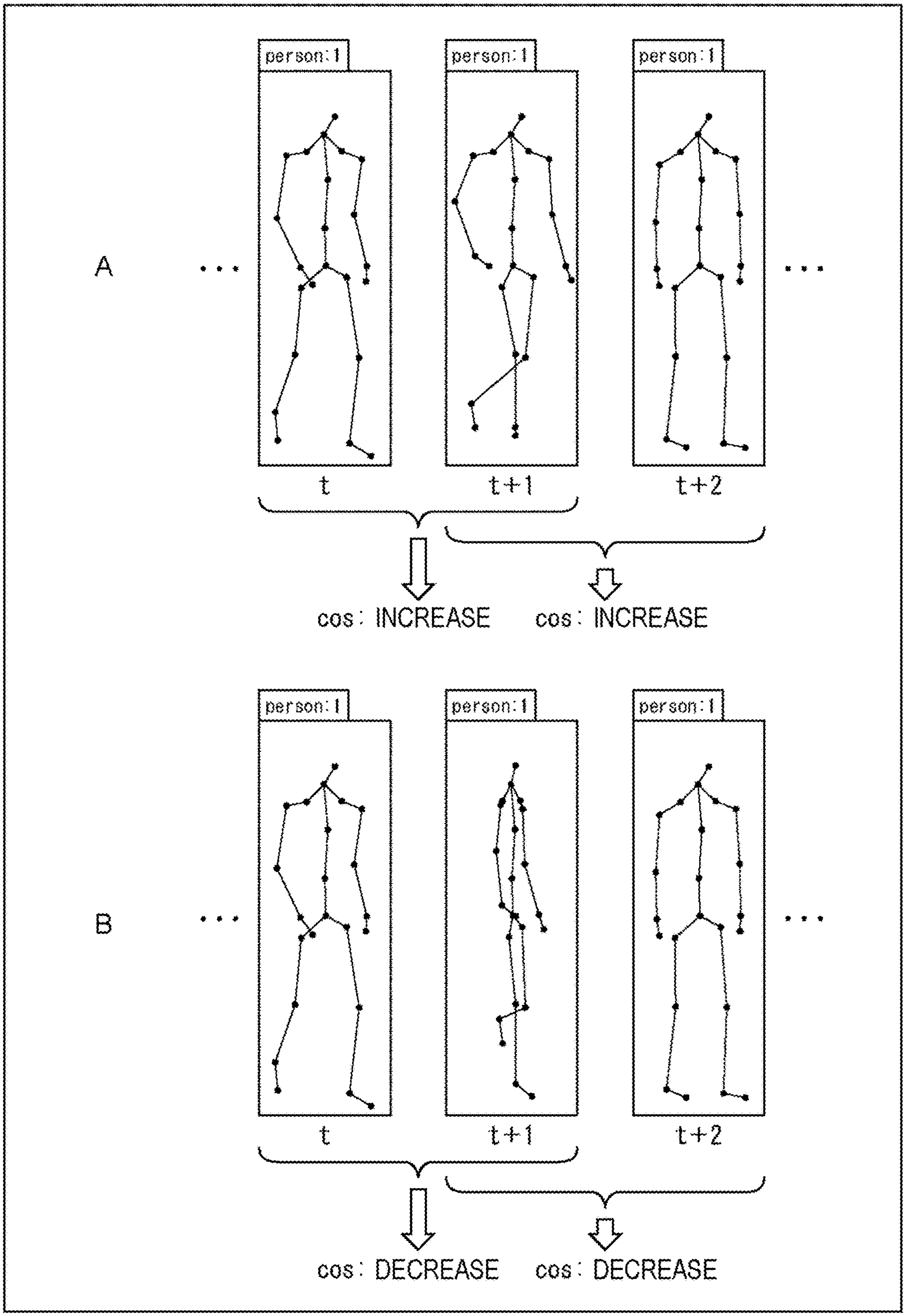
FIG. 10 is a diagram illustrating data cleansing processing of deleting posture data according to a time series constraint.

With reference to FIG. 10, data cleansing processing of deleting posture data according to a time series constraint will be described.

For example, the similarity of the vectors can be determined on the basis of the cos similarity shown in the following Expression (2).

[Ex. 2]

$$\text{cos similarity} = \frac{\vec{a}\cdot\vec{b}}{|a||b|} \quad (2)$$

Here, Expression (2) is an expression for obtaining the cos similarity between a vector a and a vector b. The cos similarity takes a value range from −1 to +1, and is +1 when the vector a and the vector b completely match.

Then, the data correction processing unit 18 evaluates the continuity of the posture data from a previous frame on the basis of the cos similarity of the 12 direction vectors as expressed in the following Expression (3). Then, the data correction processing unit 18 deletes posture data $[x_t\ y_t\ z_t]$ having low similarity in which an average value of the cos similarity is equal to or less than a predetermined threshold (for example, 0.9) as erroneous estimation.

[Ex. 3]

$$\text{if cos} = \text{mean}\left(\begin{bmatrix} x_{1t-1} & y_{1t-1} & z_{1t-1}\end{bmatrix}\begin{bmatrix} x_{1t} \\ y_{1t} \\ z_{1t}\end{bmatrix}, \cdots, \begin{bmatrix} x_{12t-1} & y_{12t-1} & z_{12t-1}\end{bmatrix}\begin{bmatrix} x_{12t} \\ y_{12t} \\ z_{12t}\end{bmatrix}\right) < \text{threshold then } [x_t, y_t, z_t] \text{ is deleted.} \quad (3)$$

For example, as illustrated in A of FIG. 10, the cos similarity increases in a case where the posture data at time t is similar to the posture data at time t+1, and the cos similarity increases in a case where the posture data at time t+1 is similar to the posture data at time t+2. Therefore, in this case, the data correction processing unit 18 can determine that the posture data at time t and the posture data at time t+1 have continuity, and the posture data at time t+1 and the posture data at time t+2 have continuity.

On the other hand, as illustrated in B of FIG. 10, the cos similarity is decreased in a case where the posture data at time t is not similar to the posture data at time t+1, and the cos similarity is decreased in a case where the posture data at time t+1 is not similar to the posture data at time t+2. Therefore, in this case, the data correction processing unit 18 determines that the posture data at time t and the posture data at time t+1 are not continuous and the posture data at time t+1 and the posture data at time t+2 are not continuous, and can delete the posture data at time t+1. As described above, in a case where the small cos similarity continues twice, posture data before and after the deleted posture data is treated as normal.

In this manner, the data correction processing unit 18 can remove or delete unnatural posture data by the data cleansing processing, and interpolate the removed or deleted posture data from preceding and subsequent posture data by the data interpolation processing.

Processing Example of Processing of Automatically Classifying Posture Data

A process in which the posture classification unit 19 automatically classifies posture data will be described with reference to FIGS. 11 to 13.

For example, in the data processing device 11, a mechanism for classifying time series posture data and assigning a label by the posture classification unit 19 is introduced in order to enable a processing unit in a subsequent stage to intentionally handle posture data. Here, a method of automatically classifying time series posture data into a stationary posture and a walking posture on the basis of rules will be described focusing on a movement standard deviation of each component of a specific direction vector.

Figure 11:
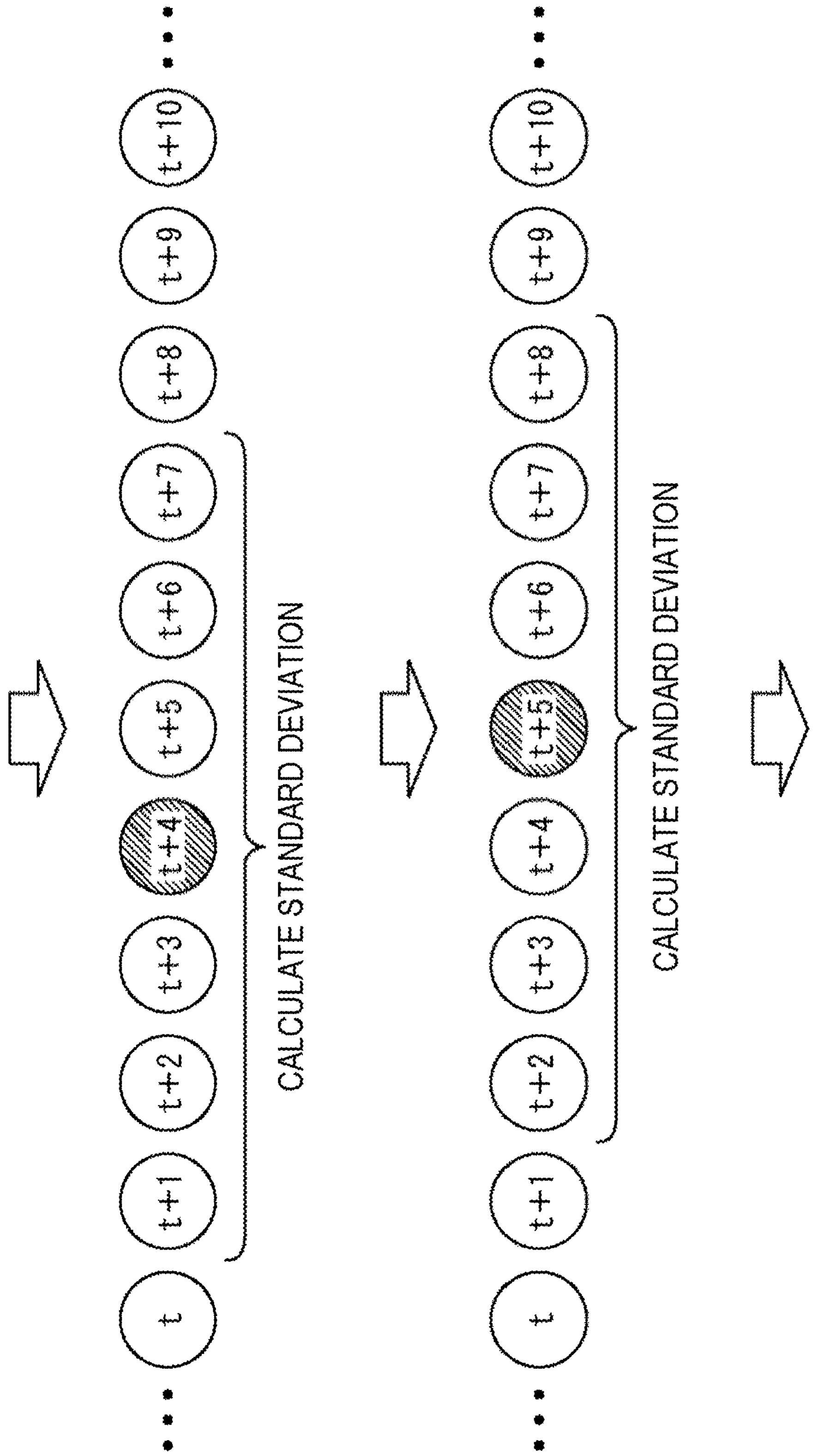
FIG. 11 is a diagram illustrating a movement standard deviation in a window size 7.

As illustrated in FIG. 11, the posture classification unit 19 calculates the movement standard deviation with a predetermined window size for the time series posture data. FIG. 11 illustrates a processing example in which the standard deviation is first calculated with a window size 7 from time t+1 to time t+7, and then the standard deviation is calculated with the window size 7 from time t+2 to time t+8.

Then, in a case where posture data is classified into a stationary posture and a walking posture, the posture classification unit 19 performs determination processing of determining a movement standard deviation according to a threshold by focusing on the Y component and the Z component of the direction vector of a foot. That is, in a case where the Y component and the Z component of the direction vector of the foot are less than the threshold, the posture data is determined to be the walking posture, and in a case where the Y component and the Z component of the direction vector of the foot are equal to or greater than the threshold, the posture data is determined to be the walking posture.

Figure 12:
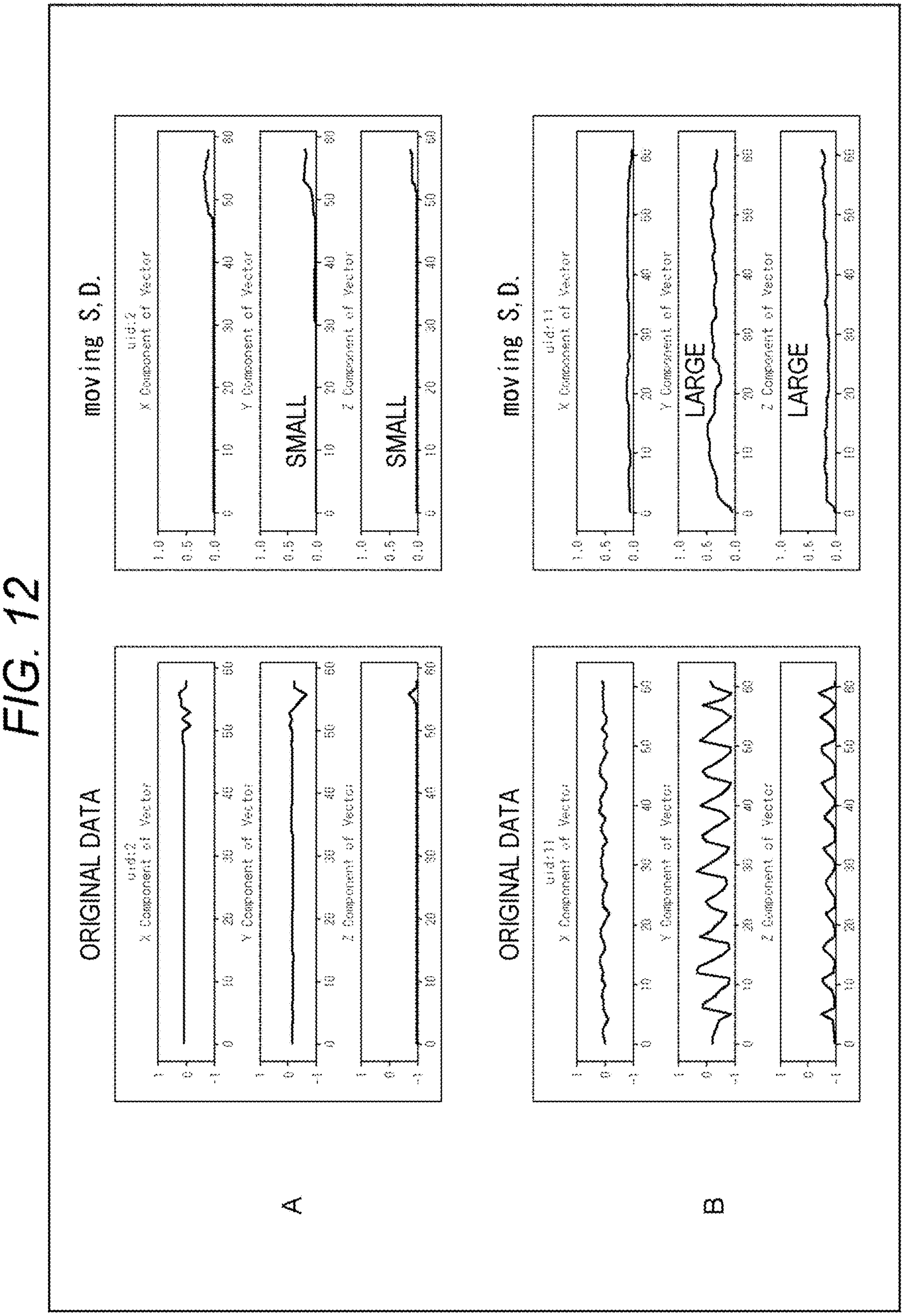
FIG. 12 is a diagram illustrating an example of original data of a direction vector of a foot and a movement standard deviation.

A of FIG. 12 illustrates an example of the original data (left side) and the movement standard deviation (right side) of the direction vector of the foot in the posture data of the person whose person ID is 2. As illustrated, since the value of the movement standard deviation is small, the posture classification unit 19 can determine the posture data as a stationary posture according to the threshold.

B of FIG. 12 illustrates an example of the original data (left side) and the movement standard deviation (right side) of the direction vector of the foot in the posture data of the person whose person ID is 11. As illustrated, since the value of the movement standard deviation is large, the posture classification unit 19 can determine this posture data as a walking posture according to the threshold.

Figure 13:
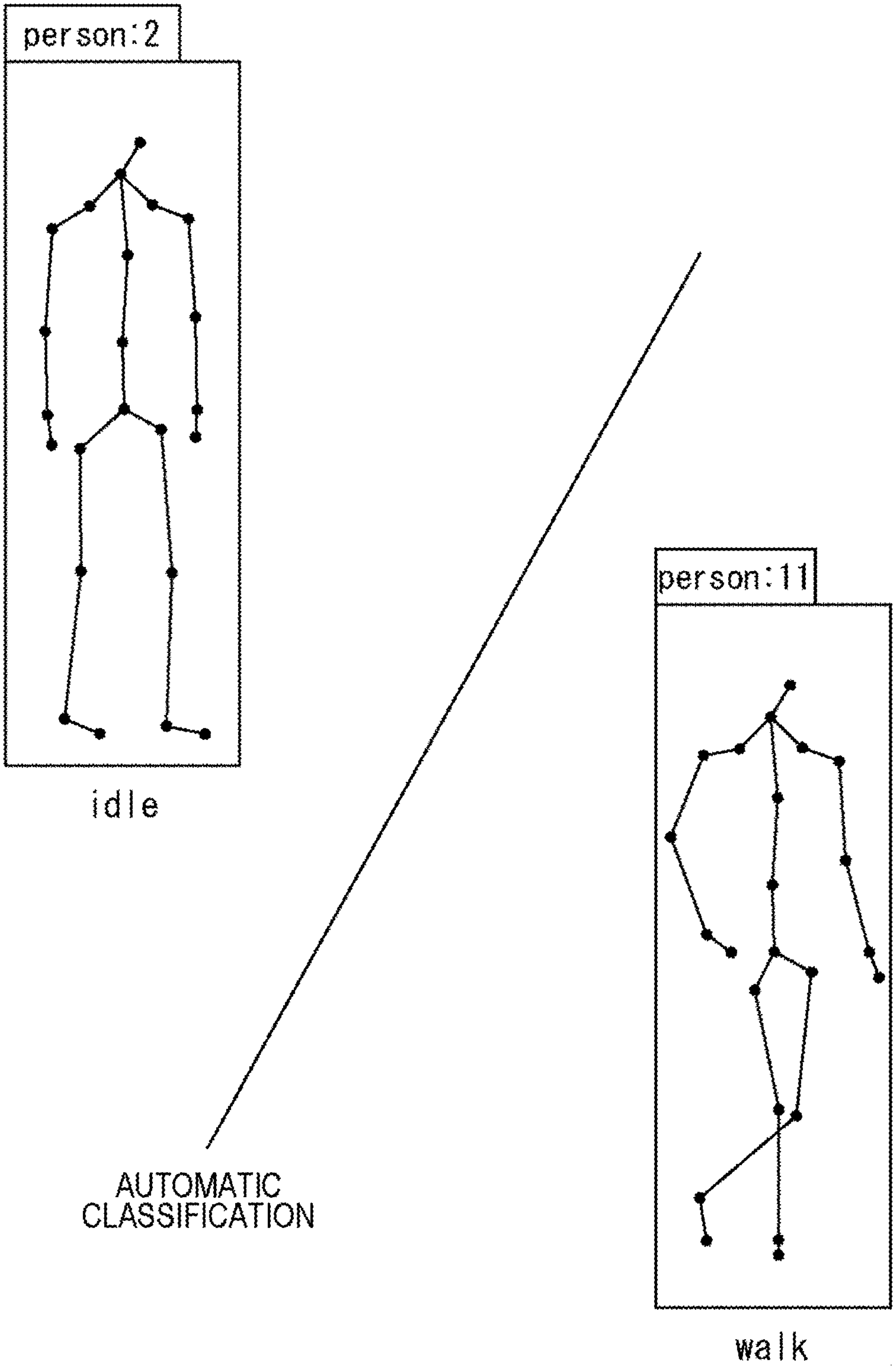
FIG. 13 is a diagram illustrating automatic classification of a stationary posture and a walking posture.

In this manner, as illustrated in FIG. 13, the posture classification unit 19 can classify the posture data of the person with the person ID of 2 as the still posture and assign a label idle, and classify the posture data of the person with the person ID of 11 as the walking posture and assign the label walk by the threshold determination.

A process in which the data expansion unit 20 generates new posture data will be described with reference to FIG. 14.

For example, in the data processing device 11, a mechanism for expanding posture data in the data expansion unit 20 is introduced so that a sufficient number of samples of posture data can be secured even if the amount of input 3D data or 2D data is small. Then, generalization performance of AI learning can be improved by automatically generating posture data.

For example, the data expansion unit 20 searches posture data having high similarity with a predetermined part of the original posture data supplied from the posture classification unit 19 (posture data having a cos similarity equal to or higher than a threshold) from the acquired posture data, and obtains a posture data group having high similarity of the part. Then, the data expansion unit 20 randomly selects one piece of posture data from the posture data group for expansion, and generates new posture data by combining a direction vector of a predetermined portion of the original posture data with a direction vector of another portion of the posture data for expansion.

Figure 14:
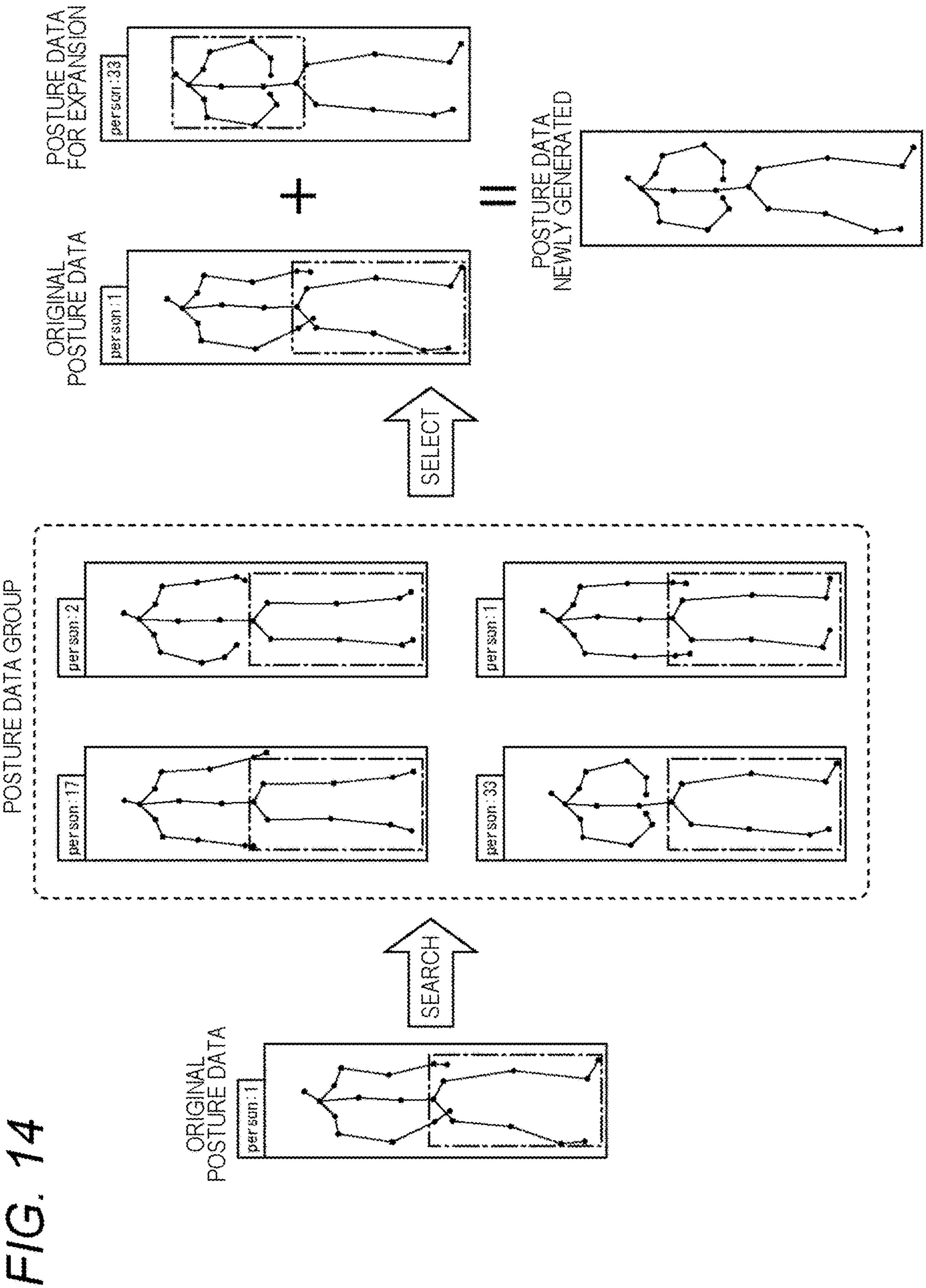
FIG. 14 is a diagram illustrating expansion of posture data.

FIG. 14 illustrates a processing example of processing in which the lower body of the original data is set as a predetermined part.

As illustrated in FIG. 14, searching is performed with the similarity of the direction vector of the lower body of the original data to obtain the posture data group of the posture data of the lower body having high similarity with the lower body of the original data. Then, posture data for expansion is randomly selected from the posture data group. Moreover, new posture data is generated by combining the direction vector of the upper body of the posture data for expansion with the direction vector of the lower body of the original posture data.

In this manner, the data expansion unit 20 expands the posture data to generate new posture data.

Processing Example of Processing of Applying Posture Data to CG Model

Processing in which the model application unit 21 applies posture data to a CG model will be described with reference to FIGS. 15 and 16.

For a predetermined direction vector, the model application unit 21 calculates a rotation axis of the direction vector of the CG model as an outer product of the direction vector of the posture data and the direction vector of the CG model, and calculates a rotation angle for rotating the direction vector of the CG model as an inner product of the direction vector of the posture data and the direction vector of the CG model. Then, the model application unit 21 can deform the posture of the CG model by the bone rotation processing so as to match the posture of the posture data.

Figure 15:
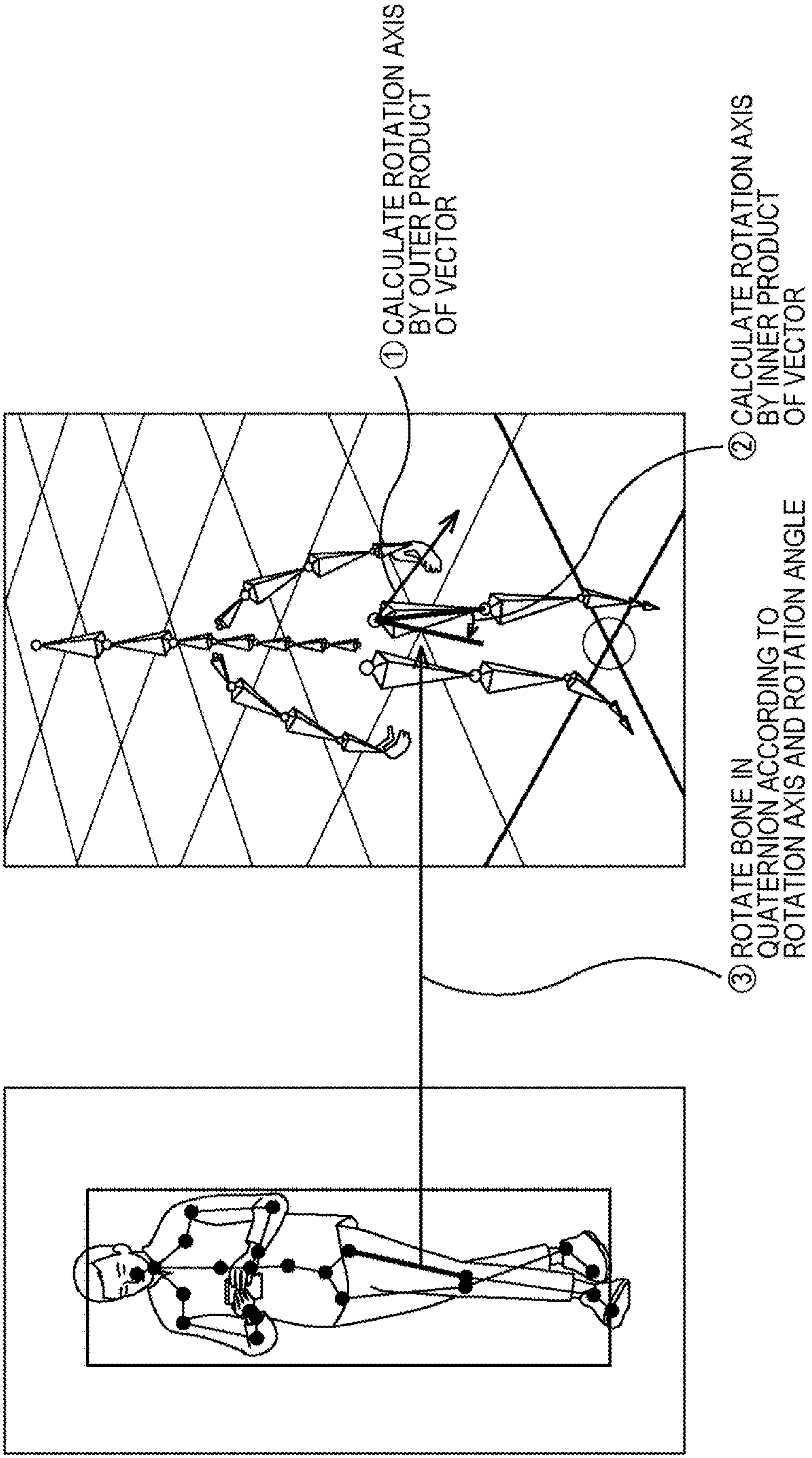
FIG. 15 is a diagram illustrating application of posture data to a CG model.

FIG. 15 illustrates a processing example of processing on the LeftLowLeg vector.

As illustrated in FIG. 15, firstly, a rotation axis of the LeftLowLeg vector of the CG model is calculated by an outer product of the LeftLowLeg vector of the posture data and the LeftLowLeg vector of the CG model. Second, a rotation angle for rotating the LeftLowLeg vector of the CG model is calculated by an inner product of the LeftLowLeg vector of the posture data and the LeftLowLeg vector of the CG model. Third, the LeftLowLeg vector (bone) of the CG model is rotated in quaternion according to the rotation axis and the rotation angle.

Here, a quaternion q represents rotation of an angle $\theta$ around an arbitrary rotation axis ($\lambda_x$, $\lambda_y$, $\lambda_z$) in a three-dimensional space, and can be expressed by four parameters as shown in the following Expression (4).

[Ex. 4]

$$q = \left(\lambda_x \sin\frac{\theta}{2}, \lambda_y \sin\frac{\theta}{2}, \lambda_z \sin\frac{\theta}{2}, \cos\frac{\theta}{2}\right) \tag{4}$$

Figure 16:
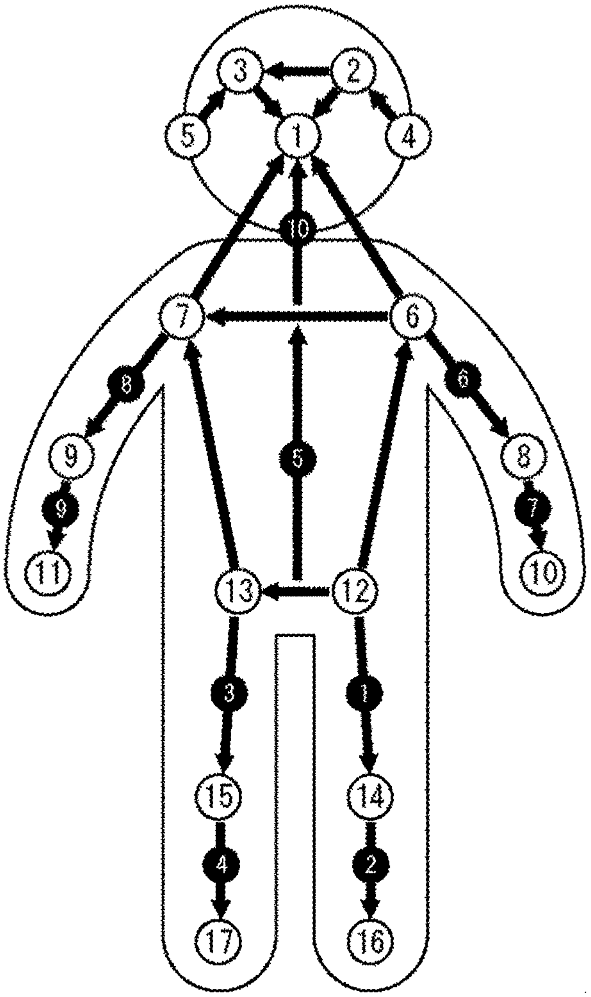
FIG. 16 is a diagram illustrating an example of an order of rotating direction vectors.

Furthermore, the model application unit 21 performs processing of sequentially rotating the direction vectors in the order (forward kinematics) according to outlined numbers in black circles in FIG. 16.

That is, the LeftUpLeg vector is first rotated, the LeftLowLeg vector is second rotated, the RightUpLeg vector is third rotated, and the RightLowLeg vector is fourth rotated. Then, fifth, a direction vector from the center of the Hip vector toward the center of the Shoulder vector is rotated.

Similarly, the LeftArm vector is sixth rotated, the LeftForeArm vector is seventh rotated, the RightArm vector is eighth rotated, and the RightForeArm vector is ninth rotated. Then, tenth, a direction vector from the center of the Shoulder vector toward the point 1 indicating the nose is rotated.

In this manner, the model application unit 21 can apply the posture data to the CG model and output the CG model of the posture according to the posture data.

Processing Example of Data Processing

Figure 17:
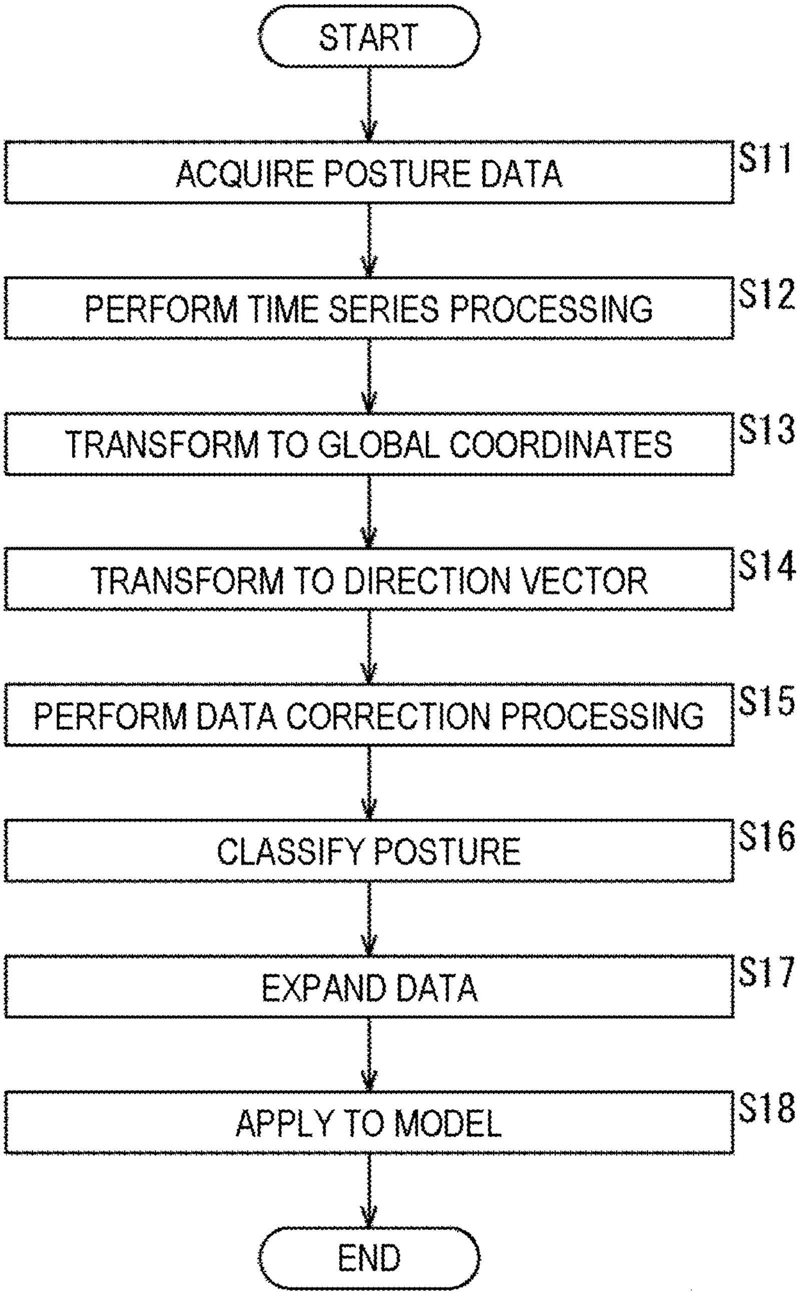
FIG. 17 is a flowchart illustrating data processing executed by the data processing device.

FIG. 17 is a flowchart illustrating data processing executed by the data processing device 11.

In Step S11, the 3D posture estimation unit 12 acquires 3D posture data on the basis of the 3D data input to the data processing device 11, and supplies the 3D posture data to the time series processing unit 15. Alternatively, the 2D posture estimation unit 13 acquires 2D posture data on the basis of the 2D data input to the data processing device 11 and supplies the 2D posture data to the 3D conversion unit 14, and the 3D conversion unit 14 acquires 3D posture data from the 2D posture data using the TOF data and supplies the 3D posture data to the time series processing unit 15.

In Step S12, the time series processing unit 15 performs time series processing of performing association for each same person on the basis of the 3D posture data supplied from the 3D posture estimation unit 12 or the 3D conversion unit 14 in Step S11, and supplies the association to the global coordinate transformation unit 16.

In Step S13, the global coordinate transformation unit 16 transforms the coordinates of the 3D posture data supplied from the time series processing unit 15 in Step S12 into global coordinates, and supplies the global coordinates to the direction vector conversion unit 17.

In Step S14, the direction vector conversion unit 17 converts the 3D posture data supplied from the global coordinate transformation unit 16 in Step S13 into a direction vector, converts the direction vector into posture data represented by a direction vector, and supplies the posture data to the data correction processing unit 18.

In Step S15, the data correction processing unit 18 performs data correction processing of performing data cleansing processing and data interpolation processing on the posture data represented by the direction vector supplied from the direction vector conversion unit 17 in Step S14, and supplies the posture data to the posture classification unit 19.

In Step S16, the posture classification unit 19 classifies the posture data supplied from the data correction processing unit 18 in Step S15 for each predetermined posture, and supplies posture data to which a label of each posture is assigned to the data expansion unit 20 and the model application unit 21.

In Step S17, the data expansion unit 20 expands posture data by combining posture data for expansion with the posture data supplied from the posture classification unit 19 in Step S16, and supplies newly generated posture data to the model application unit 21.

In Step S18, the model application unit 21 applies the posture data supplied from the posture classification unit 19 in Step S16 or the posture data supplied from the data expansion unit 20 in Step S17 to the CG model, and outputs the CG model of the posture according to the posture data.

The data processing is performed as described above, so that the data processing device 11 can output a large number of CG models to which more various posture data is applied. At this time, the data processing device 11 converts the 3D posture data into a direction vector and handles the direction vector, so that, for example, the direction vector can be automatically applied to the CG model as normalized posture data that does not depend on the position, size, and the like in the 3D data or the 2D data input to the data processing device 11. Therefore, the posture data applied to the CG model is information only in the direction between each joints that have lost the feature related to the size caused by the original person, and is applied to the CG model as posture data excluding the information that can identify the individual.

Therefore, in the data processing device 11, the posture of the person imitating a real world can be automatically applied to the CG model of the person using the posture estimation by AI of the 3D posture estimation unit 12 or the 2D posture estimation unit 13 as an input. Then, the data processing device 11 can improve convenience when handling posture data by using posture data excluding information that can identify an individual.

Moreover, the data processing device 11 can automatically classify the posture data for each predetermined posture (for example, a stationary posture or a walking posture) by analyzing an X component, a Y component, and a Z component of the direction vector of a specific part of interest (for example, a foot) as a feature amount on the basis of the time series of the posture data represented by the direction vector. For example, the accuracy of classifying the posture data can be improved by combining the feature amounts of the parts related to the movement of the classification target.

Therefore, the posture data can be handled as highly valuable data personalized for each predetermined posture, and convenience can be improved. For example, a large amount of data can be processed by automatically classifying posture data by the data processing device 11 instead of manually classifying posture data by a human. Furthermore, unlike the classification of posture data based on AI, preparation of a data set including annotation work and the like can be made unnecessary.

Note that, in the present embodiment, posture estimation by AI of the 3D posture estimation unit 12 or the 2D posture estimation unit 13 is used as an input, but the present technology can be applied to posture data acquired by, for example, a motion capture method. Furthermore, the data processing device 11 and the TOF sensor are incorporated into an image sensor, thereby making it possible to realize a configuration in which the CG model to which the posture of the person captured in the image captured by the image sensor is applied is output from the image sensor.

Configuration Example of Computer

Next, a series of the processes described above (an information processing method) may be performed by hardware or can be performed by software. In a case where the series of the processes is performed by the software, a program configuring the software is installed on a general-purpose computer, and the like.

Figure 18:
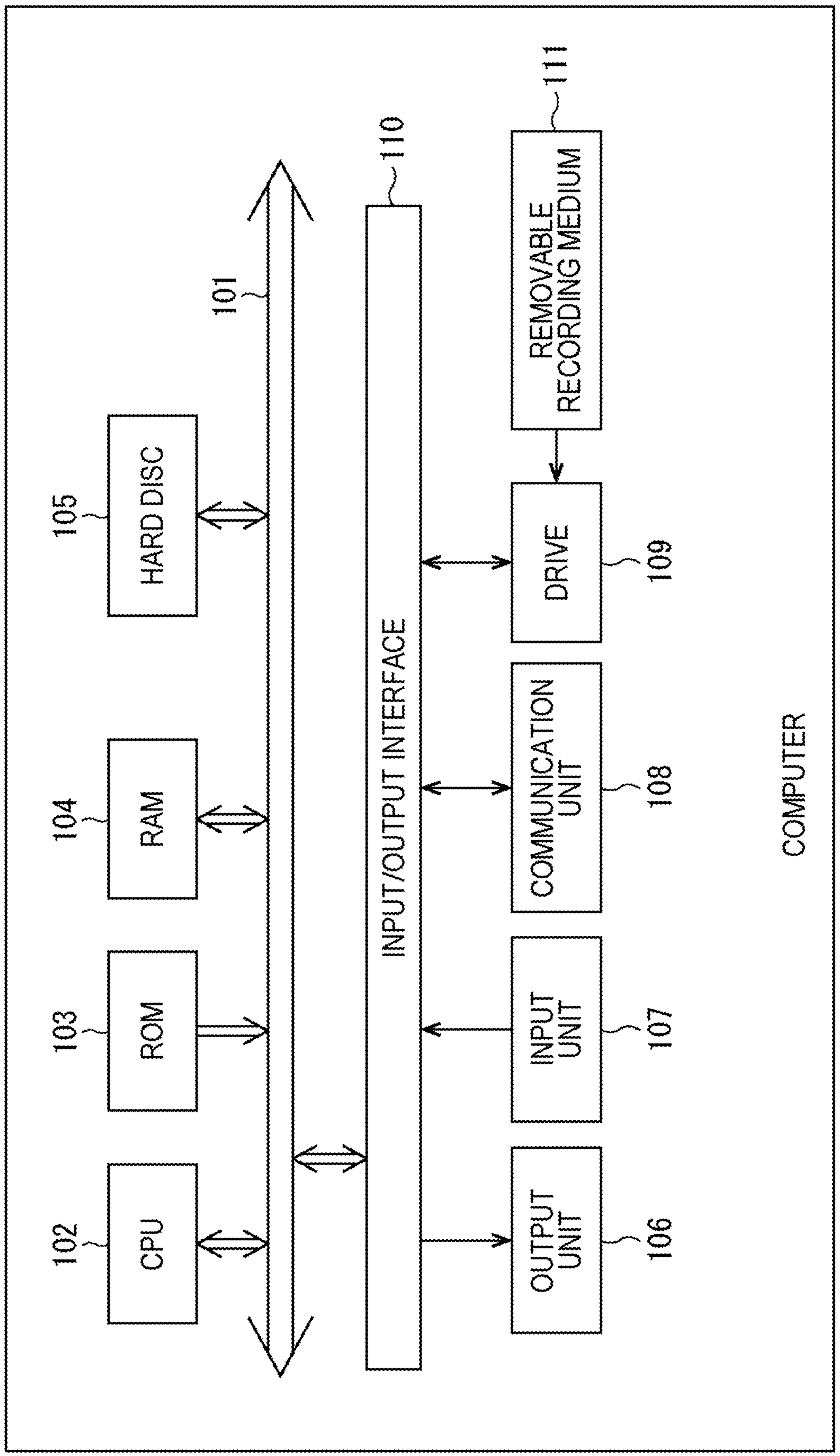
FIG. 18 is a block diagram illustrating a configuration example of a computer according to an embodiment of the present technology.

FIG. 18 is a block diagram illustrating a configuration example of an embodiment of a computer in which a program for executing the above-described series of processing is installed.

The program can be recorded in advance on a hard disk 105 or ROM 103 as a recording medium incorporated in the computer.

Alternatively, further, the program can also be stored (recorded) in a removable recording medium 111 driven by a drive 109. Such a removable recording medium 111 can be provided as so-called package software. Here, examples of the removable recording medium 111 include, for example, a flexible disk, a compact disc read only memory (CD-ROM), a magneto optical (MO) disk, a digital versatile disc (DVD), a magnetic disk, a semiconductor memory, and the like.

Note that, in addition to installing the program on the computer from the removable recording medium 111 as described above, the program can be downloaded to the computer through a communication network or a broadcasting network and installed on the hard disk 105 to be incorporated. In other words, for example, the program can be wirelessly transferred from a download site to the computer through an artificial satellite for digital satellite broadcasting, or can be transferred by a wire to the computer through a network such as a local area network (LAN) and the Internet.

The computer has a built-in central processing unit (CPU) 102, and an input/output interface 110 is connected to the CPU 102 through a bus 101.

Upon receiving a command input by the user, for example, by operating the input unit 107 through the input/output interface 110, the CPU 102 executes a program stored in the read only memory (ROM) 103 accordingly. Alternatively, the CPU 102 loads a program stored in the hard disk 105 into a random access memory (RAM) 104 to execute the program.

Therefore, the CPU 102 performs a process according to the flowchart described above or a process to be performed according to a configuration in the block diagram described above. Then, as necessary, the CPU 102 outputs a processing result from an output unit 106, or transmits the processing result from a communication unit 108, and further, causes the hard disk 105 to record the processing result, and the like, through the input/output interface 110, for example.

Note that, the input unit 107 includes a keyboard, a mouse, a microphone, and the like. Furthermore, the output unit 106 includes a liquid crystal display (LCD), a speaker, and the like.

Here, in the present description, the process to be performed by the computer in accordance with the program is not necessarily performed in time series according to orders described in the flowcharts. In other words, the process to be performed by the computer in accordance with the program includes processes to be executed in parallel or independently (for example, a parallel process or an object-based process).

Furthermore, the program may be processed by one computer (one processor) or processed in a distributed manner by a plurality of computers. Moreover, the program may be transferred to a distant computer to be executed.

Moreover, in the present description, a system means a set of a plurality of components (devices, modules (parts), and the like), and it does not matter whether or not all the components are in the same housing. Consequently, a plurality of the devices housed in separate housings and connected through the network and one device in which a plurality of the modules is housed in one housing are both systems.

Furthermore, for example, a configuration described as one device (or one processing unit) may be divided and configured as the plurality of the devices (or the processing units). Conversely, configurations described above as a plurality of devices (or processing units) may be collectively configured as one device (or processing unit). Furthermore, a configuration other than the above-described configurations may be added to the configuration of each apparatus (or individual processing unit). Moreover, if the configuration and operation of the entire system are substantially the same, a part of the configuration of a certain device (or a certain processing unit) may be included in the configuration of another device (or another processing unit).

Furthermore, for example, the present technology can be configured as cloud computing in which one function is shared and jointly processed by the plurality of the devices through the network.

Furthermore, for example, the program described above can be executed by any device. In this case, the device is only required to have a necessary function (a functional block and the like) and obtain necessary information.

Furthermore, for example, each Step described in the flowcharts described above can be executed by one device, or can be executed in a shared manner by the plurality of the devices. Moreover, in a case where a plurality of processes is included in one Step, the plurality of the processes included in the one Step can be executed by one device or shared and executed by the plurality of the devices. In other words, the plurality of the processes included in one Step can also be executed as processes of a plurality of Steps. On the contrary, the processes described as the plurality of the Steps can also be collectively executed as one Step.

Note that, in the program to be executed by the computer, the processes in Steps describing the program may be executed in time series in the order described in the present description, or may be executed in parallel, or independently at a necessary timing such as when a call is made. That is, unless there is a contradiction, the process in the each Step may also be executed in an order different from the orders described above. Moreover, the processes in the Steps describing the program may be executed in parallel with processes of another program, or may be executed in combination with processes of the other program.

Note that, a plurality of the present technologies that has been described in the present description can each be implemented independently as a single unit unless there is a contradiction. Of course, a plurality of arbitrary present technologies can be implemented in combination. For example, part or all of the present technology described in any of the embodiment can be implemented in combination with part or all of the present technology described in other embodiments. Furthermore, a part or all of the present technologies described above may be implemented in combination with another technology not described above.

Examples of Configuration Combinations

Note that the present technology can also have the following configuration.

(1)

A data processing device including:

a direction vector conversion unit that converts 3D posture data represented by specific feature points of a person into a direction vector and represents the posture data with a plurality of direction vectors; and a model application unit that applies the posture data represented by the direction vector to a CG model of a person.

(2)

The data processing device according to (1) described above, further including a data correction processing unit that performs data cleansing processing of removing the posture data that cannot be taken by a human from the posture data represented by the direction vector or deleting the posture data according to a time series constraint.

(3)

The data processing device according to (2) described above, in which the data correction processing unit performs a data interpolation process of interpolating the removed or deleted posture data by using preceding and subsequent posture data.

(4)

The data processing device according to any one of (1) to (3) described above, further including a posture classification unit that classifies the posture data for each predetermined posture and gives a label of each posture.

(5)

The data processing device according to (4) described above, in which the posture classification unit classifies the posture data by threshold determination of a movement standard deviation of a specific direction vector.

(6)

The data processing device according to any one of (1) to (5) described above, further including a data expansion unit that generates new posture data by combining a certain posture data with another posture data having high similarity with a predetermined part of the posture data.

(7)

A data processing method including:

by a data processing device, converting 3D posture data represented by specific feature points of a person into a direction vector, and representing the posture data with a plurality of direction vectors; and applying the posture data represented by the direction vector to a CG model of a person.

(8)

A program causing a computer of a data processing device that performs data processing to execute:

converting 3D posture data represented by specific feature points of a person into a direction vector;

representing the posture data with a plurality of direction vectors; and applying the posture data represented by the direction vector to a CG model of a person.

Note that, the present embodiment is not limited to the embodiments described above, and various modifications can be made without departing from the gist of the present disclosure. Furthermore, the effects described herein are merely examples and are not limited, and other effects may be provided.

REFERENCE SIGNS LIST

11 Data processing device
12 3D posture estimation unit
13 2D posture estimation unit
14 3D conversion unit
15 Time series processing unit
16 Global coordinate transformation unit
17 Direction vector conversion unit
18 Data correction processing unit
19 Posture classification unit

20 Data expansion unit

21 Model application unit

The invention claimed is:

1. A data processing device comprising:

circuitry that:

for each of a plurality of predetermined postures:

converts individual elements of 3D posture data represented by corresponding specific feature points of a person into a corresponding direction vector and represents the individual elements of the 3D posture data with a plurality of direction vectors; and applies the plurality of direction vectors to a computer graphic (CG) model of the person, wherein the circuitry classifies 3D posture data for each of the plurality of predetermined postures based on a posture-specific threshold determination of a movement standard deviation of a specific direction vector and gives a label to each of the plurality of predetermined postures.

2. The data processing device according to claim 1, wherein, for posture data that cannot be taken by a human, the circuitry performs one of:

a data cleansing process of removing the posture data that cannot be taken by a human from the posture data represented by the direction vector, or a data deleting process of deleting the posture data that cannot be taken by a human from the posture data represented by the direction vector according to a time series constraint.

3. The data processing device according to claim 2, wherein the circuitry performs a data interpolation process of interpolating the removed or deleted posture data by using preceding and subsequent posture data.

4. The data processing device according to claim 1, wherein the circuitry generates new posture data by combining existing posture data with other posture data having characteristics related to characteristics of a predetermined part of the existing posture data.

5. The data processing device according to claim 1, wherein the circuitry performs human recognition based on the CG model of the person.

6. A data processing method performed by a data processing device and comprising:

for each of a plurality of predetermined postures:

converting individual elements of 3D posture data represented by corresponding specific feature points of a person into a corresponding direction vector and represents the individual elements of the 3D posture data with a plurality of direction vectors; and applying the plurality of direction vectors to a computer graphic (CG) model of the person, wherein the data processing method further includes classifying 3D posture data for each of the plurality of predetermined postures based on a posture-specific threshold determination of a movement standard deviation of a specific direction vector and gives a label to each of the plurality of predetermined postures.

7. The data processing method according to claim 6, further comprising:

performing human recognition based on the CG model of the person.

8. A non-transitory computer product containing a program causing a computer of a data processing device that performs data processing to execute a method that comprises:

for each of a plurality of predetermined postures:

converting individual elements of 3D posture data represented by corresponding specific feature points of a person into a corresponding direction vector and represents the individual elements of the 3D posture data with a plurality of direction vectors; and applying the plurality of direction vectors to a computer graphic (CG) model of the person, wherein the data processing method further includes classifying 3D posture data for each of the plurality of predetermined postures based on a posture-specific threshold determination of a movement standard deviation of a specific direction vector and gives a label to each of the plurality of predetermined postures.

9. The non-transitory computer product according to claim 8, wherein the method further comprises:

performing human recognition based on the CG model of the person.

* * * * *